Figure 1:
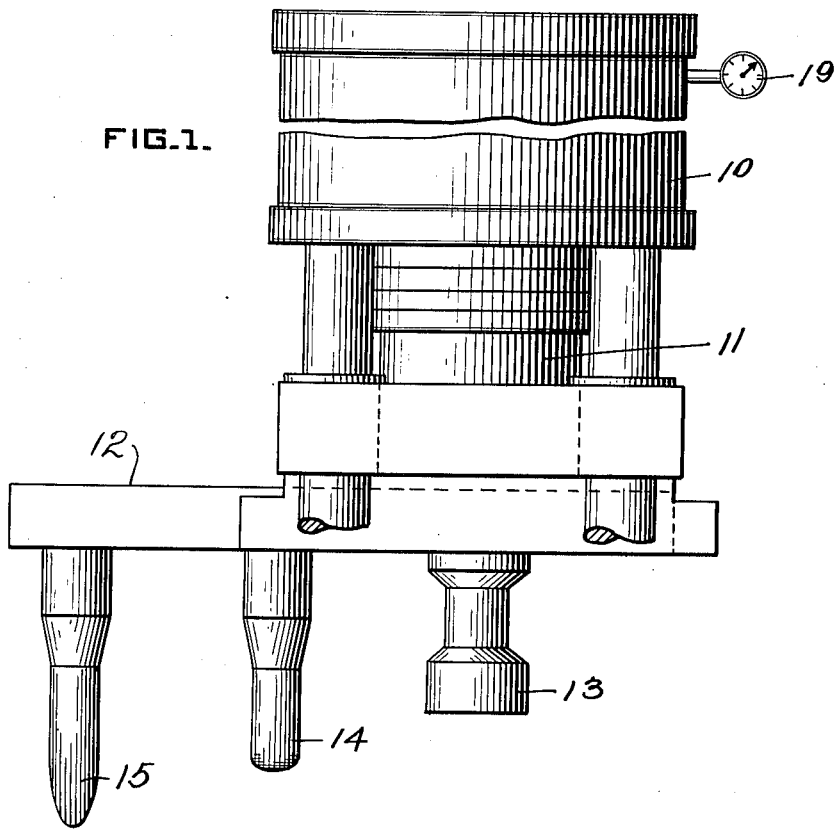
Figure 1:
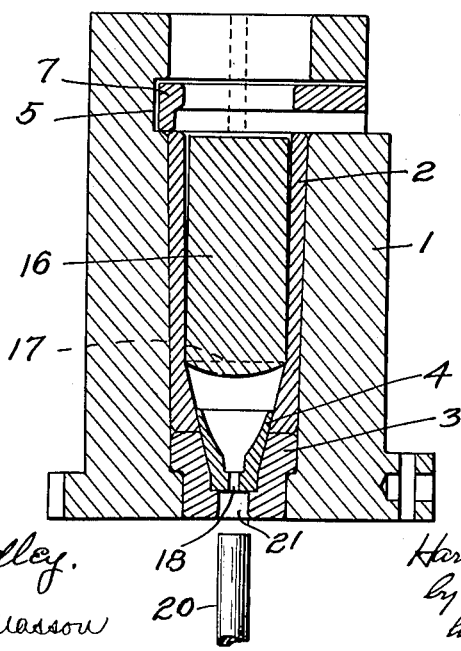

H. W. SHONNARD.
PROCESS OF MANUFACTURING HIGHLY COMPRESSED PROJECTILES.
APPLICATION FILED OCT. 3, 1917.

1,292,106.  Patented Jan. 21, 1919.
3 SHEETS—SHEET 1.

WITNESSES
J. Herbert Bradley.
Francis J. Tomasson

INVENTOR
Harold W. Shonnard
by Christy and Christy
his Attorneys

H. W. SHONNARD.
PROCESS OF MANUFACTURING HIGHLY COMPRESSED PROJECTILES.
APPLICATION FILED OCT. 3, 1917.
1,292,106.
Patented Jan. 21, 1919.
3 SHEETS—SHEET 2.
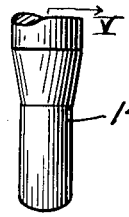
FIG.2.
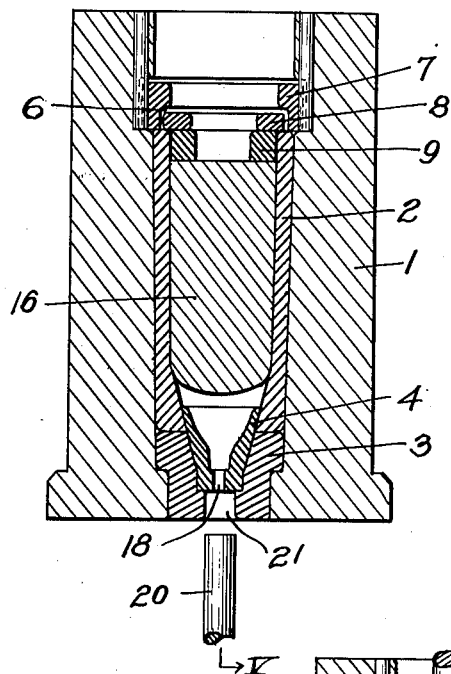
FIG.3.
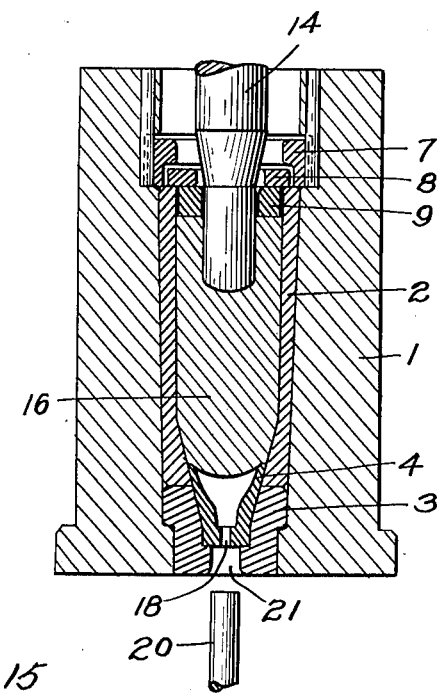
FIG.4.
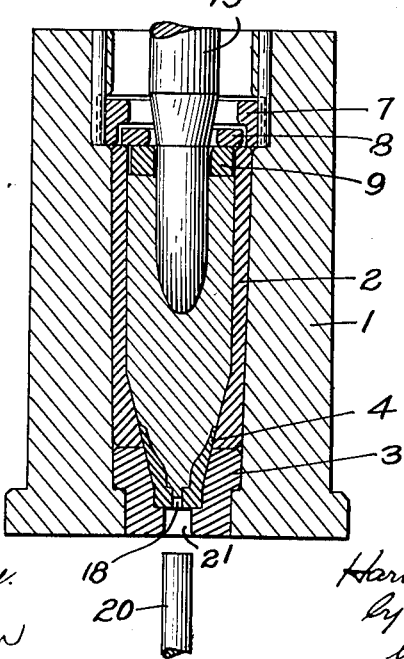
WITNESSES
INVENTOR H. W. SHONNARD.
PROCESS OF MANUFACTURING HIGHLY COMPRESSED PROJECTILES.
APPLICATION FILED OCT. 3, 1917.

1,292,106.

Patented Jan. 21, 1919.
3 SHEETS—SHEET 3.

WITNESSES

INVENTOR

UNITED STATES PATENT OFFICE.

HAROLD W. SHONNARD, OF UPPER MONTCLAIR, NEW JERSEY, ASSIGNOR TO CRUCIBLE STEEL COMPANY OF AMERICA, OF PITTSBURGH, PENNSYLVANIA, A CORPORATION OF NEW JERSEY.

PROCESS OF MANUFACTURING HIGHLY-COMPRESSED PROJECTILES.

1,292,106.   Specification of Letters Patent.   Patented Jan. 21, 1919.

Application filed October 3, 1917. Serial No. 194,607.

*To all whom it may concern:*

Be it known that I, HAROLD W. SHONNARD, residing at Upper Montclair, in the county of Essex and State of New Jersey, a citizen of the United States, have invented or discovered certain new and useful Improvements in Processes of Manufacturing Highly-Compressed Projectiles, of which improvements the following is a specification.

My invention relates to the manufacture of what, for the want of a better term, I call high physical projectiles; and by such term as used hereinafter in the specification and claims, I mean to describe and define projectiles the metal of which must be so worked as to give it such physical qualities or properties as may be obtained only by the working of metal.

While, in its broader aspects, my invention is unlimited to the manufacture of any specific type of projectiles, it is particularly applicable to armor piercing projectiles. Because such projectiles have solid noses or ogivals and thick cavity walls, the working of the metal is, in their actual manufacture, accomplished with considerably greater difficulty and expense than the working of the metal of other types of projectiles not thus characterized.

The object of my invention is to provide an improved process of manufacturing high physical projectiles whereby a heated blank may be simultaneously formed into a projectile and the metal thereof properly worked, and whereby such projectiles may be quickly manufactured at a low operating cost of production and without the use of apparatus involving a large initial installation expense.

My invention proceeds upon my specific discovery that a fourteen inch armor piercing projectile may be simultaneously formed and the metal thereof worked by confining a heated blunt end metal blank in a die having the general shape of the required finished projectile, and, by means of a piercing punch or tool, piercing the blank at the central portion of its outer end thereby causing the metal to flow into the tapered end of the die, the metal being held or restrained against rearward flow between the punch and the wall of the die, the blank as a whole being immovable within the die.

Figure 5:
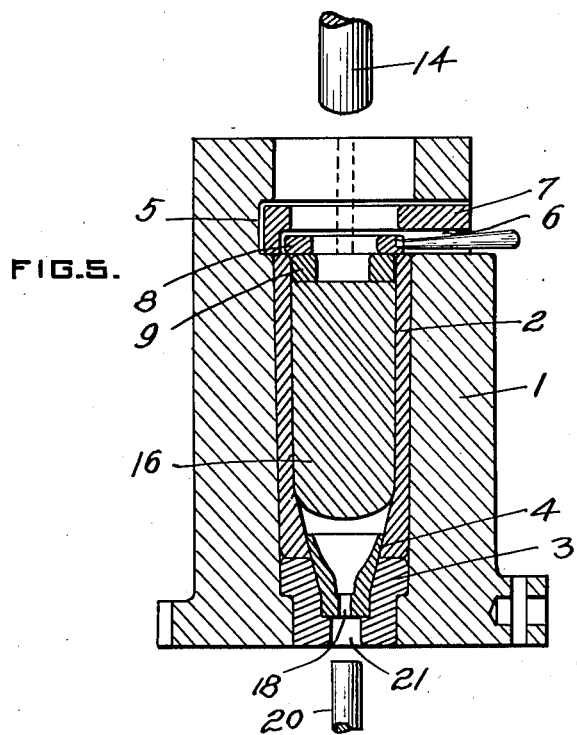
Figure 6:
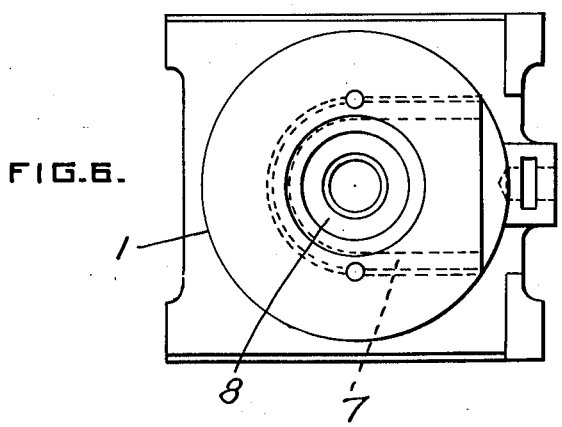

My invention may be best understood by explaining it in detail with reference to apparatus which may be used for practising it. In the accompanying sheets of drawings I have shown such apparatus. Figure 1 is a central sectional view of a die and its housing and a fragmentary side elevation of a hydraulic press. In this view a cylindrical blank is shown within the die housing in readiness for the first step of the operation. Figs. 2, 3 and 4 are sectional views similar to Fig. 1 showing the several successive steps of the operation; Fig. 5 a sectional view of the die and housing taken on the line V—V, Fig. 2; and Fig. 6 a plan view of the die and housing.

Before describing my invention in detail I will explain the construction of the apparatus shown herein whereby it may be practised, which apparatus, however, forms no part of my present invention, but is claimed in my co-pending application, Serial No. 194,608, filed of even date herewith.

A die of the same general interior shape as that of the required finished projectile is mounted within a housing 1, the die being formed of three parts, namely, upper and lower sections 2 and 3 and an ejector section 4. The upper portion of the housing is provided with a lateral opening 5 forming a guideway adapted to receive a laterally slidable die lock 7, which, in turn, is provided with a suitable recess 6 forming a guideway to receive a stripper ring 8. The stripper ring overhangs the upper die section 2 and locks in position a ring 9, which serves the double purpose of centering the piercing punches and of restraining the flow of the metal rearwardly or upwardly around the piercing punches.

As fragmentarily represented in Fig. 1, a suitable hydraulic press is arranged above the die and housing, the same including a cylinder 10 and piston rod 11. At the end of this rod there is slidably mounted a carrier 12 provided with a blocking punch 13 and two piercing punches 14 and 15.

In the practice of the process which I provide, a blunt end heated blank 16 is first placed in the die 2 in the approximate position indicated in Fig. 1. The expression blunt end, is meant to designate a blank the end of which is not tapered to an extent sufficient to fill the tapered portion of the die. However, the end of the blank may be rounded as shown or it may have a plane end, as indicated by the dotted line 17. The body of the blank may be cylindrical or other shape of equivalent volume, such as square, octagonal, etc.

Preliminary to the formation of the projectile, the blank 16 is forced downwardly into the die to the position indicated in Fig. 2, the lower end of the blank having a wedging engagement with the upper end of the tapered portion of the die. This may be effected by operating the press 10, 11 to bring the blocking punch 13 to bear upon the top of the blank, the rings 8 and 9 being at this time removed from the housing. The blank being thus blocked down, the flow restraining ring 9 is placed on the top thereof, and the ring 8 slid laterally to the position indicated in Fig. 2, where, during the piercing operation, it locks the ring 9 against vertical movement.

The piercing operation for forming the projectile and working the metal thereof may be effected by one or more punches as desired. However, the initial piercing is preferably effected by the blunt-end punch 14, and the final piercing by a tapered-end punch 15. In the initial piercing, the blunt end punch 14 is forced into the blank approximately to the depth indicated in Fig. 3, the metal at the opposite end of the blank being forced into the upper part of the tapered-end of the die. In the final piercing, the tapered-end tool 15 is forced into the blank approximately to the depth indicated in Fig. 4, the metal then entirely filling the die as well as being extruded into a nub-forming portion 18 of the ejector section 4.

During the time the piercing tools are being driven or forced into the blank, the annular body of metal surrounding the tools is, by the restraining ring 9, held against flow in an upward direction, with the result that the main body of the metal below the tool is caused to flow ahead of the tool into the tapered portion of the die. This flow is resisted by the tapered portion of the die with the result that the metal is placed under pressure and becomes worked both by compression and flow under pressure.

In case greater working of the metal is required than that effected by the process as thus far described, the metal may be further compressed by causing the tool to pierce the blank to a still greater depth. This further working of the metal may be considered as a separate step in the process in which the heated centrally-pierced blank completely fills the die and the punch fills the cavity. The metal being thus confined in all directions against flow, greater power is applied to the tool than that usually required for the above described piercing and metal working step, with the result that the volume of the blank is diminished, or, to state it differently, its specific gravity is increased, and the metal becomes correspondingly worked. To indicate the amount of power applied to the tool, which amount will in turn be an indication of the amount of work done upon the blank, a suitable gage 19 may be attached to the hydraulic press 10. This power will by reason of the localized application of the punching tool, become intensified throughout the entire mass of the blank. Stated differently, much less applied power is required to effect a given internal pressure upon the metal when the power is applied solely by the tool (the metal surrounding the tool being restrained against rearward flow) than if such power were applied to the entire base of the blank.

Each blank from which a projectile is formed comprises as a minimum the required amount of metal for a finished projectile plus an excess for machine finishing its outer walls and inner cavity. Such excess amount of metal as a blank may have will lessen the depth of the cavity and will subsequently be removed in the machining operation. Thus, regardless of the exact quantity of metal in the blank, a predetermined power may be applied to work and compress the metal to the desired extent.

After the projectile is formed it may be removed from the die by means of a suitable lifting plunger 20 operating through an opening 21 in the bottom of the die section 3 and exerting its force upon the bottom of the ejection 4, the ring 8 being previously removed from the housing.

That the process which I provide actually effects a working of the nose-forming metal of an armor piercing projectile, I have determined by an actual test upon a fourteen inch projectile. In the first place a test specimen of U. S. standard dimensions, namely, about two inches long and a half inch in diameter, was cut from the end of the blank from which the projectile was manufactured and subjected to a tensile test to fracture. The specimen showed an elastic limit of 64,000 pounds per square inch, an ultimate strength of 97,500 pounds per square inch, an elongation of 16.0% and a reduction in area of 22.7%. After the projectile had been formed according to the process described above, and without further treatment, a test specimen of the same size was cut from the central interior of the nose and subjected to a like tensile test to fracture. This specimen showed an elastic limit of 66,000 pounds per square inch, an ultimate strength of 115,000 pounds per square inch, an elongation of 16.3% and a reduction in area of 36.9%.

According to the provisions of the patent statutes I have described the principle and operation of my invention together with the specific manner in which I now consider it may be most advantageously practised. However, I desire to have it understood that, within the scope of the appended claims, my invention may be practised with other forms of apparatus than that specifically shown, and in different manners than that specifically described.

I claim as my invention:

1. The process of manufacturing tapered end highly compressed projectiles, which consists of confining a blunt end heated blank in a die having the general shape of the required finished projectile and simultaneously forming the projectile and working the metal of the blank by applying longitudinally of the blank a metal-flowing and blank-piercing pressure solely at the central portion thereof, and during the application of such pressure restraining against rearward flow of the metal at the outer portion of the blank.

2. A step in the process of manufacturing a highly compressed projectile, which consists in confining, in a die of the general shape of the required finished projectile and against flow longitudinally of the die, a heated centrally-pierced blank of the same shape as the die, and compressing the blank by further piercing its center.

3. The process of manufacturing tapered end highly compressed projectiles, which consists in first confining a blunt end heated blank in a die having the general shape of the required finished projectile and centrally piercing said blank and thereby causing the metal thereof to flow into and fill the tapered end portion of the die, and secondly in compressing the metal of the thus formed projectile by further central piercing thereof, the heated metal surrounding the piercing tool being held against rearward flow during both said piercing stages.

4. The process of manufacturing tapered end highly compressed projectiles, which consists in first confining a blunt end heated blank in a die having the general shape of the required finished projectile and centrally piercing said blank and thereby causing the metal thereof to flow into and fill the tapered end portion of the die, and secondly in compressing the metal of the thus formed projectile by further central piercing thereof, the heated metal surrounding the piercing tool being held against rearward flow during both said piercing stages, and the last of said piercing stages being effected under a regulated pressure greater than that under which the first piercing stage is effected.

5. The process of manufacturing an armor piercing projectile, which consist of confining a blunt end heated blank in a die having the general shape of the required finished projectile and simultaneously forming the projectile and working the metal of the blank by applying longitudinally of the blank a metal-flowing and blank-piercing pressure solely at the central portion thereof, and during the application of such pressure restraining against rearward flow the metal at the outer portion of the blank.

In testimony whereof I have hereunto set my hand.

HAROLD W. SHONNARD.

Witnesses:
 GEO. V. JAMES,
 HERMAN C. ENGELMAN.